United States Patent
Fukumoto et al.

(10) Patent No.: US 6,971,206 B2
(45) Date of Patent: Dec. 6, 2005

(54) OPENING MOVEMENT CONTROL DEVICE OF A SLIDING DOOR FOR A VEHICLE

(75) Inventors: Ryoichi Fukumoto, Nagoya (JP); Katsuhisa Yamada, Toyota (JP); Masayuki Uchitsunemi, Chiryu (JP); Kenji Kobashi, Toyota (JP); Shinji Okada, Toyota (JP); Katsuaki Maruyama, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/443,884

(22) Filed: May 23, 2003

(65) Prior Publication Data

US 2004/0139657 A1 Jul. 22, 2004

Related U.S. Application Data

(63) Continuation of application No. 10/253,537, filed on Sep. 25, 2002, now abandoned.

(30) Foreign Application Priority Data

Sep. 26, 2001 (JP) .............................. 2001-294095

(51) Int. Cl.[7] .............................................. E05F 11/44
(52) U.S. Cl. .............................. 49/351; 49/349; 49/360
(58) Field of Search .......................... 49/348, 349, 351, 49/360; 296/155

(56) References Cited

U.S. PATENT DOCUMENTS

| | | | | |
|---|---|---|---|---|
| 2,008,517 A | * | 7/1935 | Roethel | 74/89.19 |
| 3,965,618 A | * | 6/1976 | Pickles | 49/103 |
| 4,723,456 A | * | 2/1988 | Kohler et al. | 74/89.18 |
| 5,715,630 A | * | 2/1998 | Szerdahelyi et al. | 49/351 |
| 6,412,222 B1 | * | 7/2002 | Hashiba et al. | 49/168 |
| 6,447,806 B1 | * | 9/2002 | Gassmann et al. | 424/490 |
| 6,513,285 B2 | * | 2/2003 | Isomura | 49/351 |
| 6,725,606 B2 | * | 4/2004 | Nishikawa et al. | 49/502 |
| 2004/0216382 A1 | * | 11/2004 | Jaerpsten et al. | 49/351 |

FOREIGN PATENT DOCUMENTS

JP  2000-160930  6/2000

* cited by examiner

*Primary Examiner*—Gregory J. Strimbu
(74) *Attorney, Agent, or Firm*—Finnegan, Henderson, Farabow, Garrett & Dunner, LLP

(57) ABSTRACT

An opening movement control device of a sliding door on a vehicle body. The sliding door having an outer panel connected to an inner panel to define a space therebetween, with a window glass slidably supported between the panels. A link mechanism disposed in the space includes a drive link coupled to the glass to cause reciprocal motion thereof. A drive shaft is rotatably supported by a module base, with one end passing through the module base, and another end fixed to the drive link. A cam member is fixed on the one end of the drive shaft, and a cam follower is movably supported by the inner panel and contacting the cam member. A stopper coupled to the cam follower contacts the vehicle body only when the glass moves down to prevent movement of the door when the window glass is down.

7 Claims, 7 Drawing Sheets

OPENING MOVEMENT CONTROL DEVICE OF A SLIDING DOOR FOR A VEHICLE

This is a continuation of application Ser. No. 10/253,537, filed Sep. 25, 2002, now abandoned, which is incorporated herein by reference.

BACKGROUND OF THE INVENTION

1. Field of the Invention

The present invention relates to an opening movement control device of a sliding door for a vehicle, and more particularly, relates to a device for controlling an opening movement of a sliding door when a window glass of the sliding door opens with respect to a predetermined position.

2. Description of the Related Art

In a prior sliding door for a vehicle, an outer panel having a window portion formed at its upper side region and an inner panel having a window portion formed at its upper side portion are opposed and are connected at their peripheral portions. A space is formed between the lower side region of the outer panel and the lower side region of the inner panel and a window glass which opens and closes the window portions is disposed in the space so as to be able to move up and down. A window regulator is mounted on the inner panel in the space and the window glass is moved up and down by the window regulator. In case that the sliding door moves to open under the condition which the window glass is opened, for example, when a hand stretches out of the window glass, there is in danger that the hand is nipped between a pillar of the window portions and a pillar of the body side.

In a Japanese Patent Laid-Open Publication No. 2000-160930, a mechanism for controlling an opening movement of a sliding door when a window glass of the sliding door opens with respect to a predetermined position. Namely, a lower end of one of a pair of links which are rotatably connected at center portion in X configuration supports a sector gear rotatably in the space of the outside of the compartment, a lower end of the other link is slidably guided horizontally. The window glass is supported on the upper ends of a pair of links. A pinion which is geared with the sector gear is driven a motor and the window glass is moved up and down. When the window glass moves down to the predetermined position by the rotation of the sector gear, a cam which is mounted on the sector gear swings a swing link. The other end of the swing link is connected to a wire of a movement transmitting cable and a coating tube is fixed to the inner panel. The movement transmitting cable is introduced to the inside of the compartment through an opening which is formed on the inner panel. The cable is connected to a stopper which is rotatably supported on the inner panel at the lower side of the front side of the sliding door. When the window glass moves down with respect to the predetermined position, the stopper rotates and projects, and contacts with a stopping member provided on the body.

In the prior device for controlling the opening movement of the sliding door, the swing link, which is operated by the cam fixed to the sector when the sliding door moves down to the predetermined position, is fixed to the inner panel at the outside of the compartment, and the stopper, to which the swing movement of the swing link is transmitted and which rotates, is supported on the inner panel at the inside of the compartment. Therefore, the movement transmitting cable has to be introduced from the outside of the compartment to the inside of the compartment through the opening which is formed on the inner panel and it is necessary to waterproof the opening by a grommet. As a result, the number of parts and the assembling steps increase and the cost increases.

SUMMARY OF THE INVENTION

It is an object of the present invention to provide an opening movement control device of a sliding door for a vehicle which can prevent the prior drawback.

According to the present invention, an opening movement control device of a sliding door for a vehicle includes an outer panel and an inner panel in which window portions are formed at their upper side region and which are connected at their peripheral portions, a space which is formed between the lower side region of the outer panel and the lower side region of the inner panel and in which a window glass for opening and closing the window portions is disposed so as to be able to move up and down, a link mechanism which supports and moves up and down the window glass and which is disposed on the inner panel at the outside of a compartment, a drive shaft which is rotated by a driving device for driving the link mechanism and which is rotatably supported on the inner panel, a cam member which is fixed to an end portion of the inside of the compartment of the drive shaft, a cam follower which contacts with a cam portion of the cam member and which is movably supported on the inner panel and a stopper which is disposed on the inner panel and which is connected to one end of the cam follower through a cable, wherein the stopper projects when the window glass moves down with respect to the predetermined position and contacts with a stopping member which is provided on a body.

DESCRIPTION OF THE PREFERRED EMBODIMENT

Figure 1:
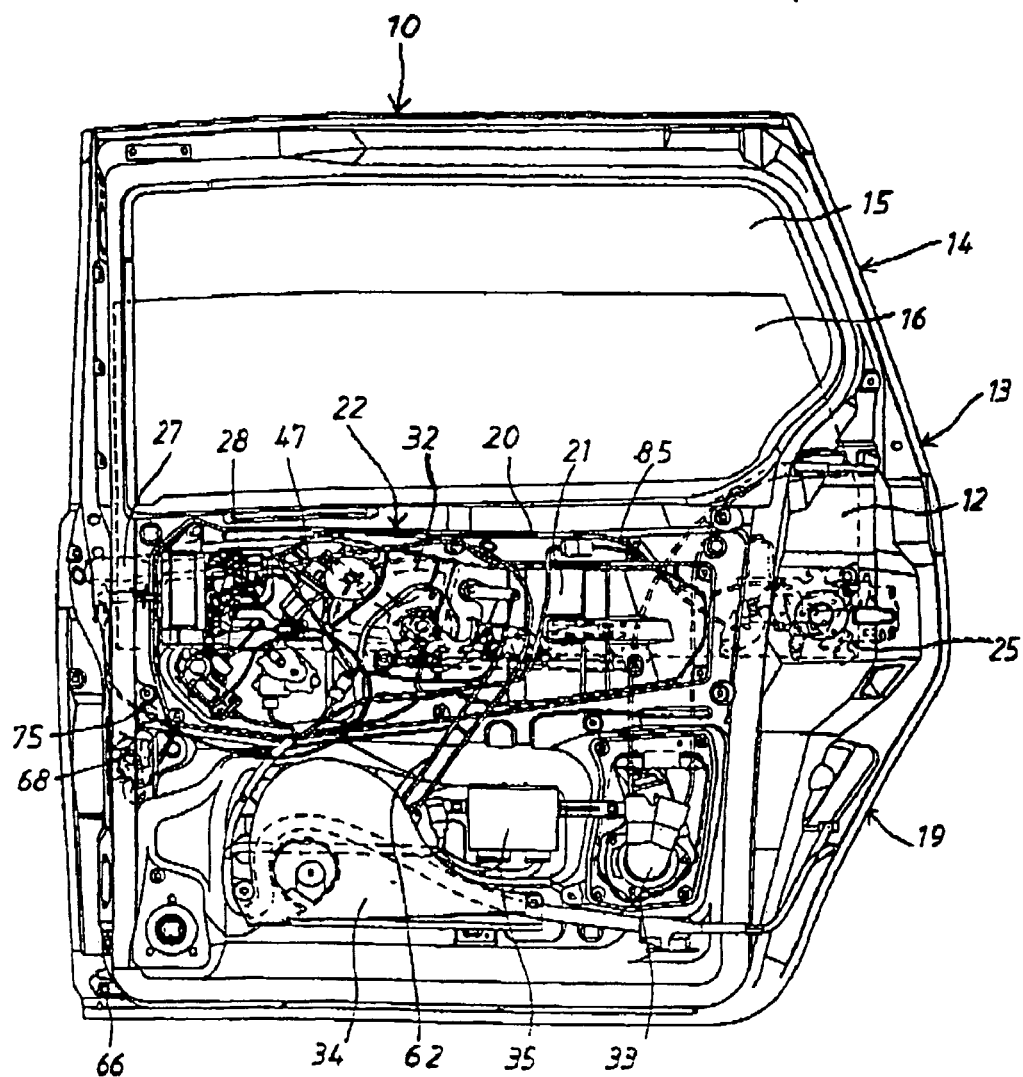
FIG. 1 is a front view of a sliding door for a vehicle which is provided with an opening movement control device according to the present invention and in which a trim is removed.
Figure 2:
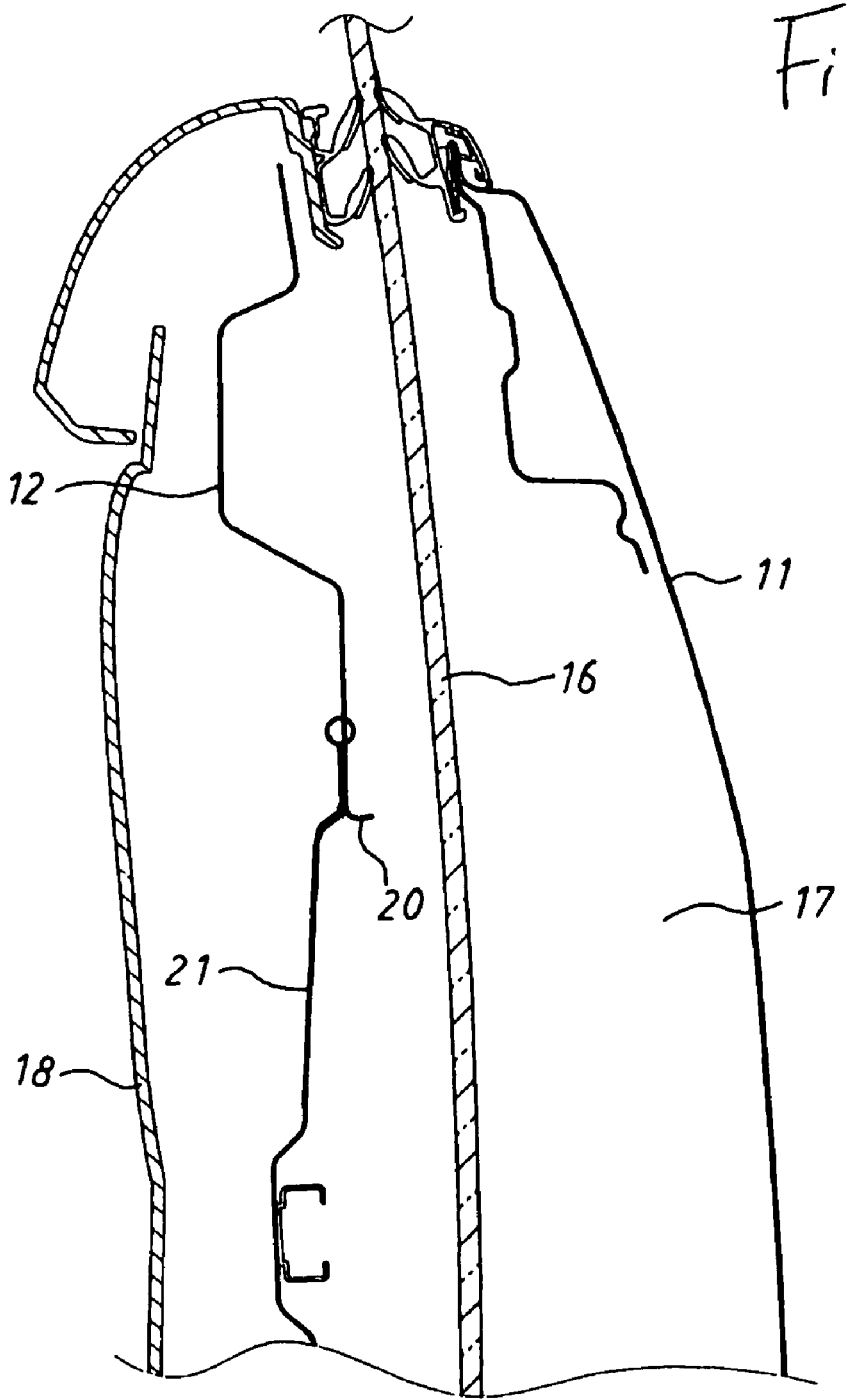
FIG. 2 is a partial sectional side view of the sliding door for a vehicle.

Hereinafter, preferred embodiments of the present invention will be explained referring to drawings. As shown in FIG. 1 and FIG. 2, a window portion 15 penetrates an upper side region 14 of a door main body 13 which is formed by connecting between an outer panel 11 and an inner panel 12 at their peripheral portions and is provided. In a lower side region 19, a space 17 in which a window glass 16 for opening and closing the window portion 15 is disposed so as to be able to move up and down is formed between the outer panel 11 and the inner panel 12. The numeral 18 is a trim which is mounted at the inside of a compartment of the door main body 13.

Figure 3:
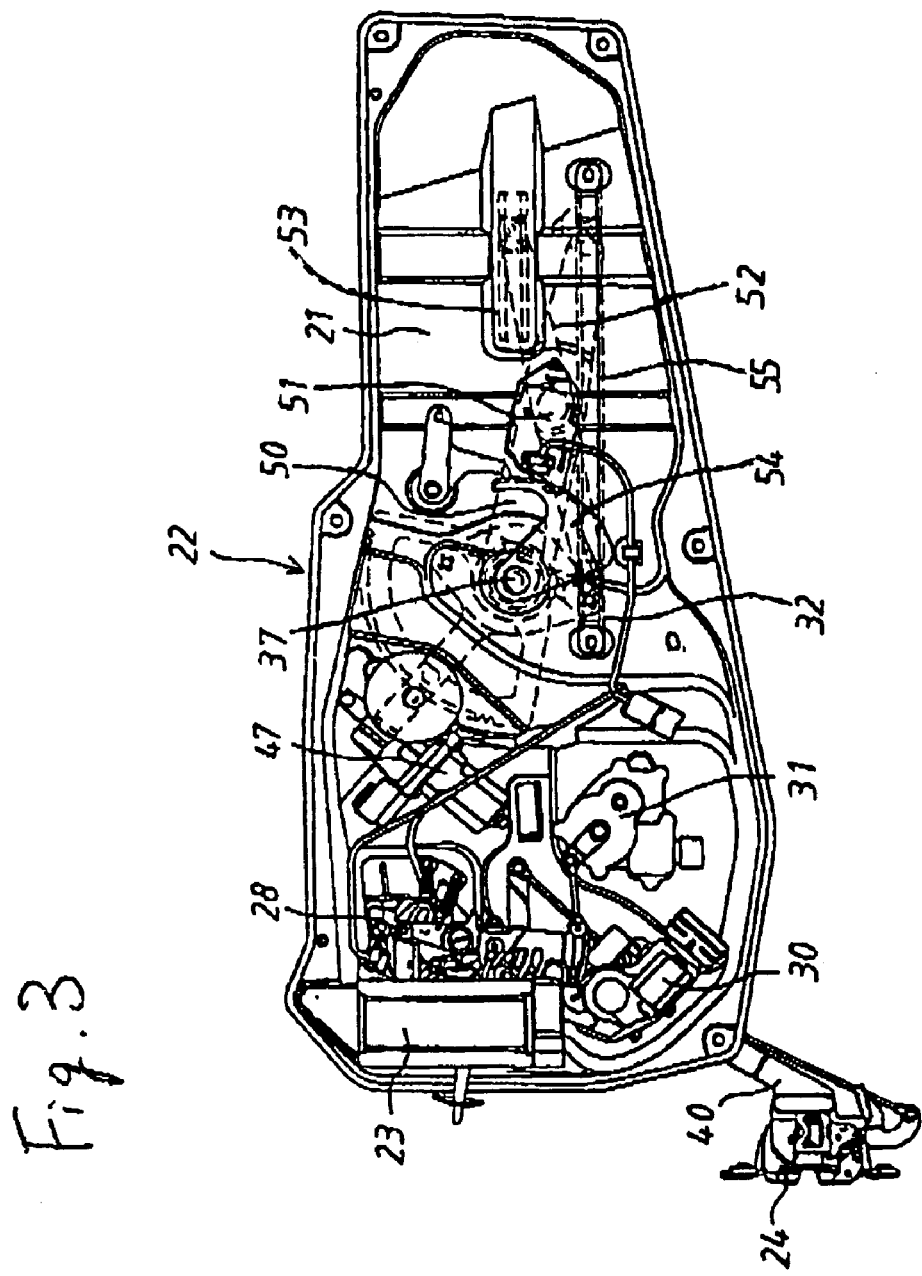
FIG. 3 is a front view of a module structure.

A horizontally long module mounting opening 20 is formed near the window portion 15 at the lower side region 19 of the inner panel 12. A peripheral portion of a module base 21 is overlapped with a peripheral portion of the module mounting opening 20 and is fluid-tightly fixed thereto through a seal, and a module structure 22 constituted by mounting a plural functional components to the module base 21 is fixed from the inside of the compartment. As shown in FIG. 3, the module structure 22 is constituted by mounting a inside handle 23 for opening and closing a sliding door 10, a front side latch mechanism 24 for maintaining the sliding door 10 in a closing state by engaging with a body, a remote control mechanism 28 for transmitting the movement of the inside handle 23 and an outside handle 27 to the front side latch mechanism 24 and a rear side latch mechanism 25 so as to be able to engage and disengage, a window regulator 32 for moving up and down the window glass 16 and so on to the module base 21.

On the inner panel 12, besides the module structure 22, the rear side latch mechanism 25 which engages the sliding door 10 with the body and which maintains the sliding door 10 in the closing state, a power sliding door driving unit 33 for opening and closing automatically the sliding door 10, an electric supply device 34 for supplying the electric power from the body side to each actuator and so on mounted on the sliding door 10 and so on are mounted.

Figure 4:
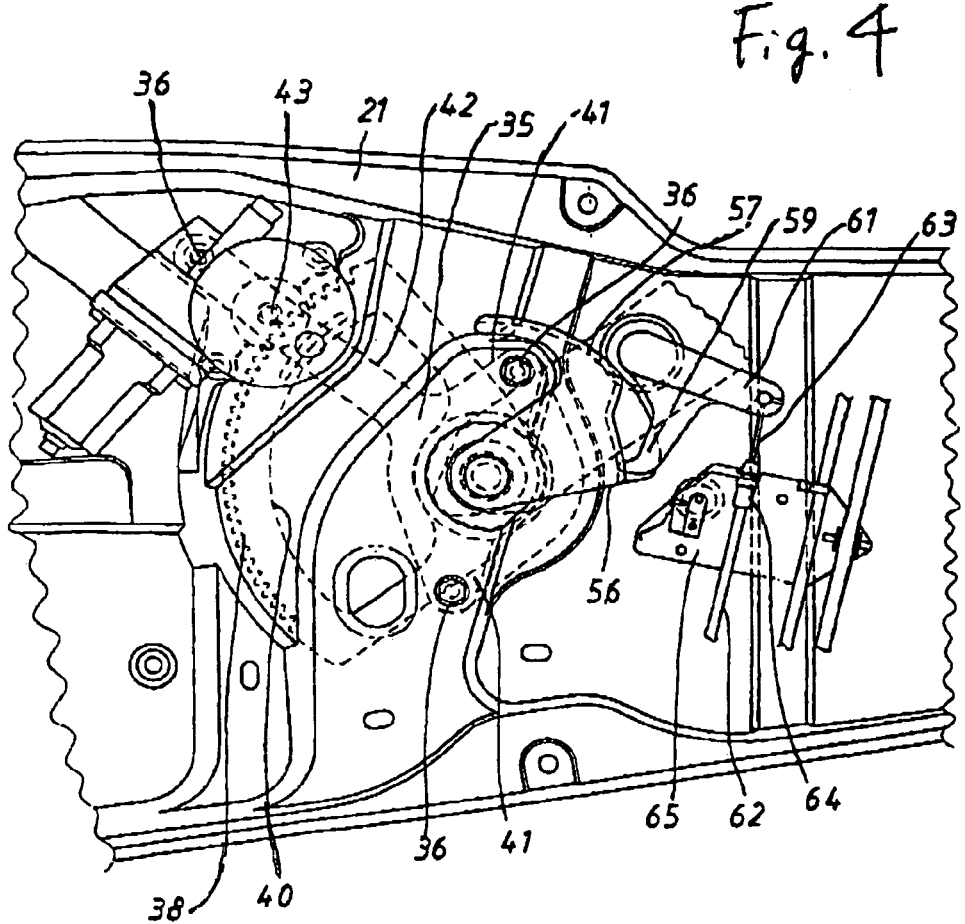
FIG. 4 is an enlarged view of an essential part of an opening movement control device a sliding door for a vehicle.
Figure 5:
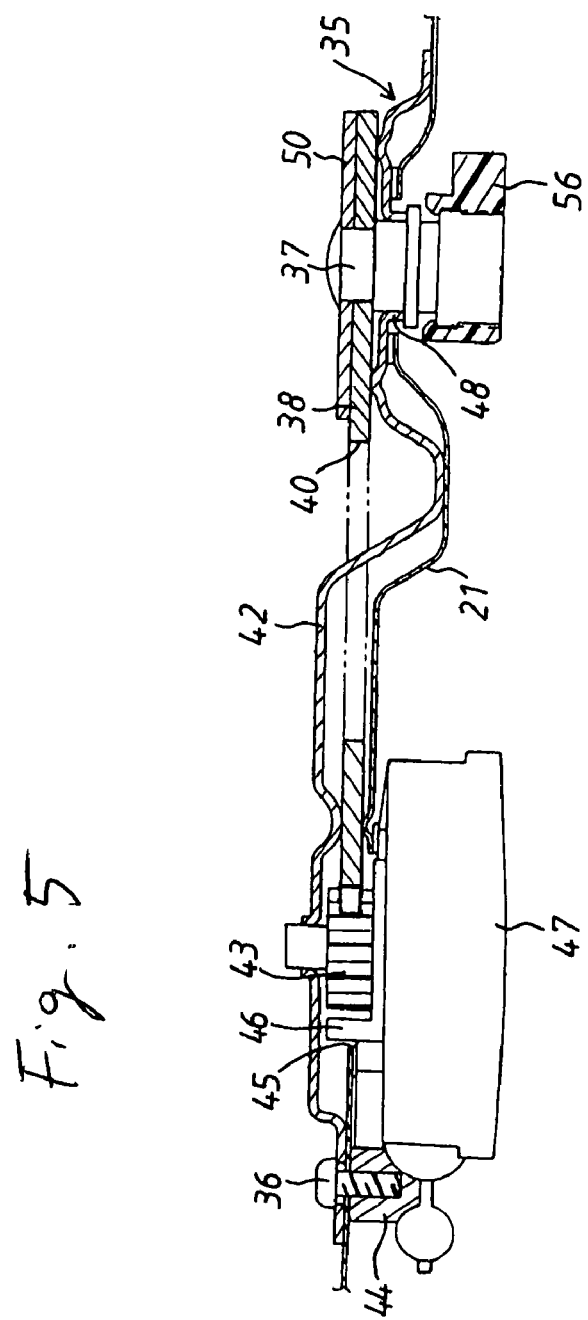
FIG. 5 is a sectional view of a mounting part of an actuator part of a window regulator and drive shaft part which is mounted to a module base.
Figure 6:
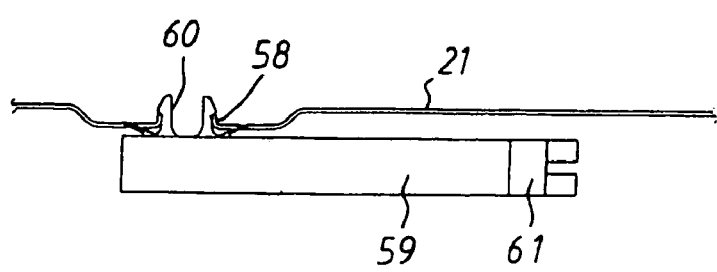
FIG. 6 is a view showing a mounting of a cam follower to the module base.

The window regulator 32 is mounted on the module base 21. As shown in FIG. 4 and FIG. 5, T-shaped reinforcing plate 35 is fixed on a side face outside of the compartment of the module base 21. The reinforcing plate 35 has minimum size in order to lighten the weight. Both ends of a top panel portion 41 of the reinforcing plate 35 are fixed to the module base 21 by screws 36. An inner edge of a bearing hole which is formed in a center portion of the top panel portion 41 is bent toward the inside of the compartment and a bearing portion 48 is formed, and a drive shaft 37 is rotatably supported. On an end portion of the drive shaft 37 which projects toward the outside of the compartment, a rotation center portion of a sector gear 38 and one end of the drive link 50 are fixed thereon so as to regulate the relative rotation. Both ends of the bearing portion 48 is nipped between a flange portion formed on the drive shaft 37 and the sector gear 38 and the movement in the axial direction of the drive shaft 37 is regulated. A strip-shaped portion 42 extended from the top panel portion 41 of the reinforcing plate 35 bends outside along the way and passes through a sectorial penetrating hole 40 formed on a center portion of the sector gear 38, and is positioned at the outside with respect to the sector gear 38. The strip-shaped portion 42 extends in parallel with the sector gear 38 and supports rotatably a shaft portion of a pinion 43 meshed with the sector gear 38. The end portion of the strip-shaped portion 42 bends inside and overlaps with the module base 21. The screw 36 penetrates this overlapped portion and is screwed to a fixing seat 44 of an actuator 47 which contacts with a side face of the inside of the compartment of the module base 21, and the end portion of the strip-shaped portion 42 is fixed to the module base 21. In a portion of the module base 21 which is opposite to the pinion 43, an opening 45 is formed and a mounting plate 46 is fixed so as to close the opening 45. The actuator 47 including a motor and a speed reduction mechanism is mounted on the mounting plate 46 and an output shaft is connected to the pinion 43. A driving device for rotating the drive shaft 37 is constituted by the actuator 47, the pinion 43, the sector gear 38 and so on.

As shown in FIG. 3, on a center portion of the drive link 50 rotated with the sector gear 38 in a body, a pin 51 is rotatably supported and one end of a guide link 52 is fixed to an inner end of the pin 51 projected toward the module base 21 of the drive link 50. The other end of the guide link 52 is guided movably in the horizontal direction by a guide 53 which is fixed to the side face of the outside of the compartment of the module base 21 and whose height is the same as the drive shaft 37. One end of a support link 54 is fixed to an outer end of the pin 51 projected to the opposite side of the drive link 50 so as to extend the guide link 52. A top end portion of the drive link 50 and a top end portion of the support link 54 are guided movably in the horizontal direction by a guide rail 55 mounted on a lower end side surface of the window glass 16 and support the window glass 16. The drive link 50, the pin 51, the guide link 52 and the support link 54 constitute a pair of links which are rotatably connected at the center portion in X configuration and are mounted to the module base 21 at the outside of compartment, and constitute a link mechanism for supporting the window glass 16 and for moving up and down the window glass 16.

The numeral 56 is a sectorial cam member which is made of resin or metal. The rotation center portion is fitted on a head portion of the drive shaft 37 projected toward the inside of the compartment through a serration fit and a hook portion formed on an inner end surface is engaged with a jaw portion of the drive shaft 37 for preventing from dropping out. The cam member 56 is fixed to the drive shaft 37 at the flip of a switch. On an outer circumferential surface of the cam member 56, a cam is formed at the rotational direction. A bearing hole 58 is formed on the module base 21 adjacent to the cam member 56. An inner edge of the bearing hole 58 is bent toward the outside of the compartment and a cylindrical inner surface is formed. A shaft portion 60 which is projected and provided on a side surface of a cam follower 59 made of resin is supported in the bearing hole 58. The shaft portion 60 is fitted into the bearing hole 58 and a hook portion formed on a top end of the shaft portion 60 is engaged with an end surface of the bent portion of the bearing hole 58 for preventing from dropping out. The cam follower 59 is rotatably supported on the module base 21 at the flip of a switch. The cam follower 59 contacts with the cam 57 of the cam member 56 at its top end portion. The cam follower 59 may be slidably mounted on the module base 21 and may be lineally moved by the cam 57.

A cable connecting portion 61 is provided on the cam follower 59. A wire 63 of a cable 62 is connected to a top end portion of the cable connecting portion 61 and a coating tube 64 is fixed to a bracket 65 which is screwed shut to the module base 21. The cable 62 is disposed adjacent to a stopper 66 which is rotatably supported on the inner panel 12 at the lower side of the front side of the sliding door 10. The wire 63 is connected to the stopper 66 and the coating tube 64 is fixed to the inner panel 12. The shape of the cam 57 is a shape for rotating the stopper 66 when the drive shaft 37 and the cam member 56 are rotated until the window glass 16 moves down to a predetermined position and for contacting the stopper 66 to a stopping member provided on a body.

Next, the operation of the opening movement control device of a sliding door for a vehicle according to the present invention is described. When an open switch of the window glass 16 is operated, the motor of the actuator 47 of the window regulator 32 rotates toward the direction which the window glass 16 moves down and the sector gear 38 is rotated by the pinion 43. Then, the drive shaft 37 is rotated clockwise in FIG. 3 and the drive link 50 is rotated in the same direction. Then, the guide link 52 is guided by the guide 53 and is rotated counterclockwise while moving in the horizontal direction. Then, the support link 54 is rotated in the same direction and the guide rail 55 is moved downward, and the window glass 16 is moved down.

When the drive shaft 37 is rotated until the window glass 16 moves down to the predetermined position, the cam 57 of the cam member 56 rotates the cam follower 59 counterclockwise and the wire 63 connected to the cable connecting portion 61 is pulled. Then, the stopper 66 is rotated to the position in which the stopper 66 contacts with the stopping member provided on the body and the opening movement of the sliding door 10 is regulated.

In the above mentioned embodiment, although the window regulator and the opening movement control device of a sliding door for a vehicle are provided on the module base, both devices may be mounted on the inner panel directly.

Figure 7A:
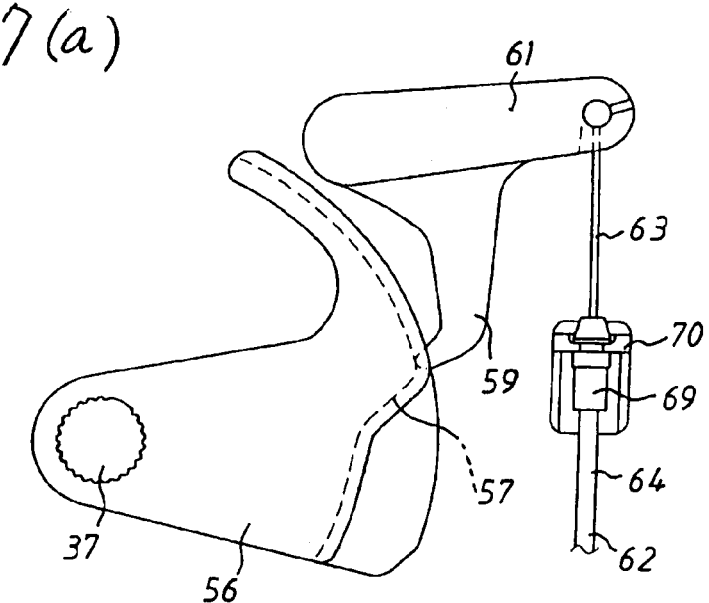
FIGS. 7(a) to 7(c) show the other embodiment of a fastener for fastening a coating tube to the module base.
Figure 7B:
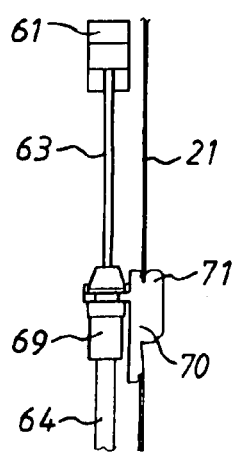
Figure 7C:
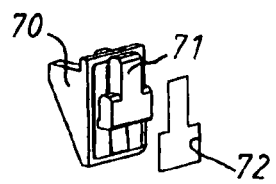

In the above mentioned embodiment, although the bracket 65 for fixing the coating tube 64 of the cable 62 is fixed to the inner panel by screw, as shown in FIGS. 7(*a*) to 7(*c*), an inverted T-shaped projection 71 is formed on a back face of resinous fastener 70 in which U-shaped concave portion for engaging a mounting portion 69 mounted on the end portion of the coating tube 64 is formed at its front face, the projection 71 is fitted into an inverted T-shaped hole 72 formed on the module base 21 while aligning the transversal line portion and moves toward the upper end of the longitudinal line of the hole 72, the fastener 70 may be fixed to the module base 21.

Figure 8A:
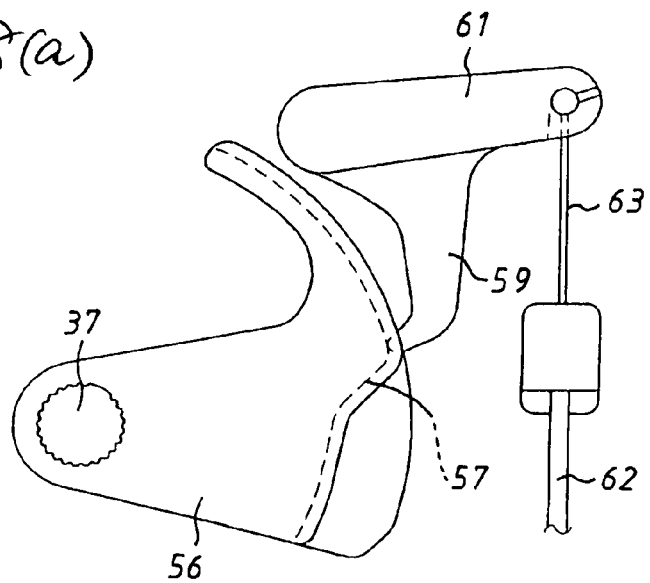
FIGS. 8(a) to 8(c) show the other embodiment for fastening a coating tube to the module base.
Figure 8B:
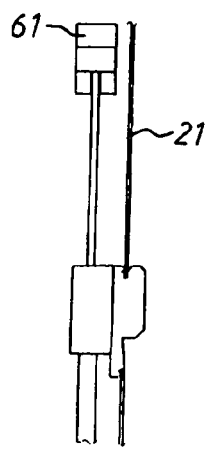
Figure 8C:

Further, as shown in FIGS. 8(*a*) to 8(*c*), the mounting portion 69 mounted on the end portion of the coating tube 64 of the cable 62 and the resinous fastener 70 may be integrally formed.

As mentioned above, in this embodiment, an opening and closing control device of opening and closing member for a vehicle includes an outer panel and an inner panel in which window portions are formed at their upper side region and which are connected at their peripheral portions, a space which is formed between the lower side region of the outer panel and the lower side region of the inner panel and in which a window glass for opening and closing the window portions is disposed so as to be able to move up and down, a link mechanism which supports and moves up and down the window glass and which is disposed on the inner panel at the outside of a compartment, a drive shaft which is rotated by a driving device for driving the link mechanism and which is rotatably supported on the inner panel, a cam member which is fixed to an end portion of the inside of the compartment of the drive shaft, a cam follower which contacts with a cam portion of the cam member and which is movably supported on the inner panel and a stopper which is disposed on the inner panel and which is connected to one end of the cam follower through a cable, wherein the stopper projects when the window glass moves down with respect to the predetermined position and contacts with a stopping member which is provided on a body. Therefore, it is not necessary to penetrate the cable into the inner panel, it is not only favorable for waterproofing, but cost can be decreased by decrease of the number of parts and number of man-hour for assembling.

Further, in this embodiment, the drive shaft fitted on the lower end of one link of a pair of links which are rotatably connected at the center portion in X configuration is rotatably supported on the inner panel, the lower end of the other link is guided slidably in the horizontally direction and the pinion meshed with the sector fitted to the drive shaft is rotated by the actuator. When the window glass is moved down with respect to the predetermined position, the cam member fixed to the end portion of the inside of the compartment of the drive shaft moves the cam follower and the movement of the cam follower is transmitted to the stopper mounted on the inner panel by the cable. Therefore, it is not necessary to penetrate the cable into the inner panel by mounting the cam member to the drive shaft of the link mechanism having simple structure. Therefore, it is not only favorable for waterproofing, but cost can be decreased by decrease of the number of parts and number of man-hour for assembling.

Further, in this embodiment, the module mounting opening is formed at the lower side region of the inner panel and the link mechanism is disposed at the outside of the compartment of the module base mounted from the inside of the compartment so as to close the module mounting opening. The drive shaft is rotatably supported on the module base and the cam member is fixed to the end portion of the inside of the compartment of the drive shaft, and the cam follower contacting with the cam portion of the cam member is supported movably on the module base. Therefore, it is able to adjust the operation as the module structure, and it is able to reduce the assembling time and cost by decrease the number of man-hour in assembling process of a vehicle and the number of parts.

What is claimed is:

1. An opening movement control device of a sliding door slidably supported on a vehicle body, the door having an outer panel, an inner panel connected to the outer panel at a peripheral portion thereof defining a space therebetween, and a window glass slidably supported between the outer panel and the inner panel, said device comprising:
    a link mechanism disposed in the space and including a drive link coupled to the window glass configured to provide a reciprocal vertical motion to the window glass;
    a module base mounted on the inner panel and overlapped with a module mounting opening provided in the inner panel;
    a drive shaft rotatably supported by the module base and having a first end portion on one side of the module base and a second end portion on the opposite side of the module base and mounted on the drive link;
    a cam member mounted on the first end portion of the drive shaft;
    a cam follower movably supported by the inner panel and contacting the cam member; and
    a stopper coupled to the cam follower and contacting the vehicle body when the window glass moves down.

2. The opening movement control device according to claim 1, wherein:
    the cam follower is supported by the module base.

3. The opening movement control device according to claim 2, further comprising:
    a reinforcing plate fixed on the module base and having a bearing portion supporting the drive shaft.

4. The opening movement control device according to claim 3, further comprising a sector gear fitted to the second end portion of the drive shaft.

5. The opening movement control device according to the claim 4, further comprising an actuator fixed on the module base and having a pinion gear meshed with the sector gear.

6. The opening movement control device according to claim 4, wherein the sector gear is arranged between the module base and the reinforcing plate, and wherein the reinforcing plate includes a strip-shaped portion passing through the sector gear.

7. The opening movement control device according to claim 6, wherein the sector gear includes an opening, and the strip-shaped portion passes through the opening.

* * * * *